United States Patent
Basu et al.

(10) Patent No.: US 7,340,522 B1
(45) Date of Patent: Mar. 4, 2008

(54) METHOD AND SYSTEM FOR PINNING A RESOURCE HAVING AN AFFINITY TO A USER FOR RESOURCE ALLOCATION

(75) Inventors: Sujoy Basu, Mountain View, CA (US);
Vanish Talwar, Palo Alto, CA (US);
Rajendra Kumar, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 856 days.

(21) Appl. No.: 10/632,447

(22) Filed: Jul. 31, 2003

(51) Int. Cl.
*G06F 15/16* (2006.01)
(52) U.S. Cl. ............... 709/226; 709/225; 709/220; 709/217
(58) Field of Classification Search ............ 709/219, 709/203, 226, 225, 220, 217
See application file for complete search history.

(56) References Cited

U.S. PATENT DOCUMENTS

| 6,424,992 B2* | 7/2002 | Devarakonda et al. ...... 709/203 |
| 2004/0193461 A1* | 9/2004 | Keohane et al. ............... 705/7 |
| 2005/0027864 A1* | 2/2005 | Bozak et al. ............... 709/226 |

* cited by examiner

*Primary Examiner*—William Vaughn
*Assistant Examiner*—Djenane Bayard

(57) ABSTRACT

A method and system for resource allocation. Specifically, in one embodiment, a method begins by receiving a request for an interactive session from a user. The request also comprises a resource requirement profile. Then, the method continues by selecting a computing resource having an affinity to the user. The computing resource is selected from a plurality of computing resources that are available to the user. The selected computing resource is implemented to support the interactive session. Thereafter, the selected computing resource is assigned to the user for use in the interactive session.

16 Claims, 7 Drawing Sheets

METHOD AND SYSTEM FOR PINNING A RESOURCE HAVING AN AFFINITY TO A USER FOR RESOURCE ALLOCATION

TECHNICAL FIELD

The various embodiments of the present invention relate to a grid computing environment. More specifically, various embodiments of the present invention relate to the pinning of resources in the grid computing environment to a user.

BACKGROUND ART

Grid computing is a method of harnessing the power of many computational resources in a network. Grid computing is a distributed computer infrastructure involving large-scale sharing applications and/or high performance processing and network bandwidth.

Referring to FIG. 1, a grid computing environment comprising a plurality of heterogeneous computing nodes distributed across multiple administrative domains. A virtual organization (e.g., VO-X, VO-Y, and VO-Z) may include nodes from different domains. For example, VO-Z includes nodes from each of Administrative Domains 110, 120, and 130.

A node (hereinafter also referred to as a computing resource) may be a member of several virtual organizations. An end-user (e.g., USER M, USER N, or USER 0) may need to access remote nodes either in the same administrative domain, or across domains. For example, User 0 may access VO-Y from within Domain 120, or User N within Domain 130 may access the same node from outside of Domain 120. Similarly, User M of Domain 130 may access both VO-Y and VO-Z through a single node in Domain 110.

Traditionally, grid computing has provided for the execution of batch jobs in the scientific and academic community. Batch execution on a grid computing environment requires authentication, authorization, resource access, resource discovery, and other services. In support of batch processing of jobs on a grid computing environment, protocols, services, application programming interfaces, and software development kits have been developed. The conventional method and system are not particularly suited for interactive grid computing sessions.

In a grid computing environment, resources are virtualized in the sense that the user does not need to know the name or IP address of a computing resource that he or she is utilizing. In this way, resources in a pool of resources can be dynamically assigned to various users depending on the demand and type of resources required. In addition, once a particular user no longer has need to continue a current computing session, the user can terminate the current computing session and release those computing resources supporting that computing session. Thereafter, the user can start a new computing session that is supported with one or more computing resources that are re-allocated to the user for the new computing session. The re-allocated computing resources typically are different from the computing resources supporting the current computing session, since computing resources are not typically reserved or dedicated to one specific user.

However, re-allocating resources to a particular user is time consuming, tedious, and inefficient in that much duplication of effort is expended to re-initialize those re-allocated computing resources for that particular user. For instance, files associated with the user will to be transferred to the re-allocated computing resources at the beginning of the new computing session. More particularly, prior art networks did not ensure that the latest version of the files were being transferred to the re-allocated computing resource. In that case, older versions of files could possibly be copied to the re-allocated computing resource resulting in lost work and inefficient duplication of effort in trying to recover the lost work. In addition, the user may also have to customize the system before starting the computing session, which leads to more time to initialize the computing resource. Also, the user may go through an initial period of unproductivity if the user has to learn specifics of the development environment that may change from one node containing one computing resource to another node containing another computing resource.

Moreover, the assignment of static accounts to particular computing resources unnecessarily ties a user to those computing resources where the user has an account. This contributes to an inefficient use of resources in a grid computing environment, especially when those computing resources are unavailable at the time the user needs those computing resources. Also, true virtualization of all the computing resources in the pool of computing resources supporting the grid computing environment is not achieved when specific computing resources are tied to a particular user through the static assignment of accounts. Since those accounts are assigned to the user, other users may not be able to utilize that computing resource, even if the computing resource is currently available, if all the accounts are pre-assigned.

DISCLOSURE OF THE INVENTION

A method and system for resource allocation. Specifically, in one embodiment, a method begins by receiving a request for an interactive session from a user. The request also comprises a resource requirement profile. Then, the method continues by selecting a computing resource having an affinity to the user. The computing resource is selected from a plurality of computing resources that are available to the user. The selected computing resource is implemented to support the interactive session. Thereafter, the selected computing resource is assigned to the user for use in the interactive session.

BRIEF DESCRIPTION OF THE DRAWINGS

The above and other objects and advantages of the present invention will be more readily appreciated from the following detailed description when read in conjunction with the accompanying drawings, wherein.

BEST MODES FOR CARRYING OUT THE INVENTION

Figure 1:
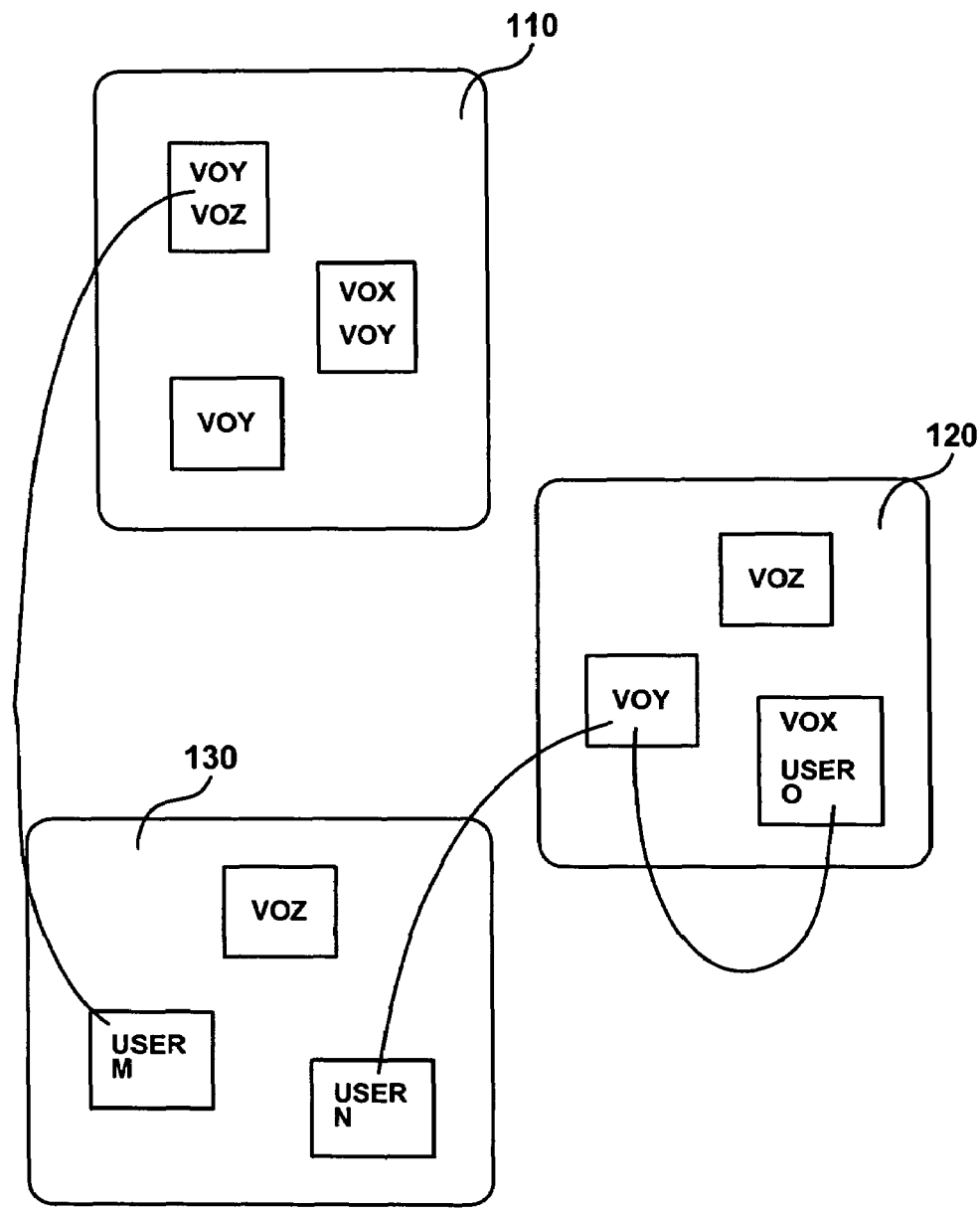
FIG. 1 is an illustration of a grid computing environment.

Reference will now be made in detail to embodiments of the present invention, a method and system for pinning resources that have an affinity to a user for resource allocation, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Embodiments of the present invention can be implemented on software running on a computer system. The computer system can be a personal computer, notebook computer, server computer, mainframe, networked computer, handheld computer, personal digital assistant, workstation, and the like. This software program is operable for pinning resources to a user for purposes of resource allocation. In one embodiment, the computer system includes a processor coupled to a bus and memory storage coupled to the bus. The memory storage can be volatile or non-volatile and can include removable storage media. The computer can also include a display, provision for data input and output, etc.

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "receiving," or "pinning," or "assigning," or "selecting," or "creating," or "updating," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Accordingly, embodiments of the present invention provide a method and system for selecting resources that have an affinity to a user for resource allocation. As a result, other embodiments of the present invention serve the above purpose and are able to assign resources to a user for an interactive session by choosing resources that have an affinity to the user. Because of the capability of the assignment of resources that have an affinity for the user, the present invention is significantly more efficient than previous techniques in the prior art for implementing a grid computing environment that assigned resources based solely on availability of resources and their ability to support the user's request. More specifically, by assigning resources that have an affinity for the user, the present invention is capable of selecting computing resources that require the least amount of initialization before being ready to support the interactive session. Moreover, other embodiments of the present invention serve the above purposes and provide for the dynamic allocation of accounts, resulting in an improved grid computing environment that does not unnecessarily tie-up computing resources through the pre-assignment of accounts to various users, as seen in conventional techniques.

Grid Computing Environment for Conducting Interactive Computing Sessions

Figure 2:
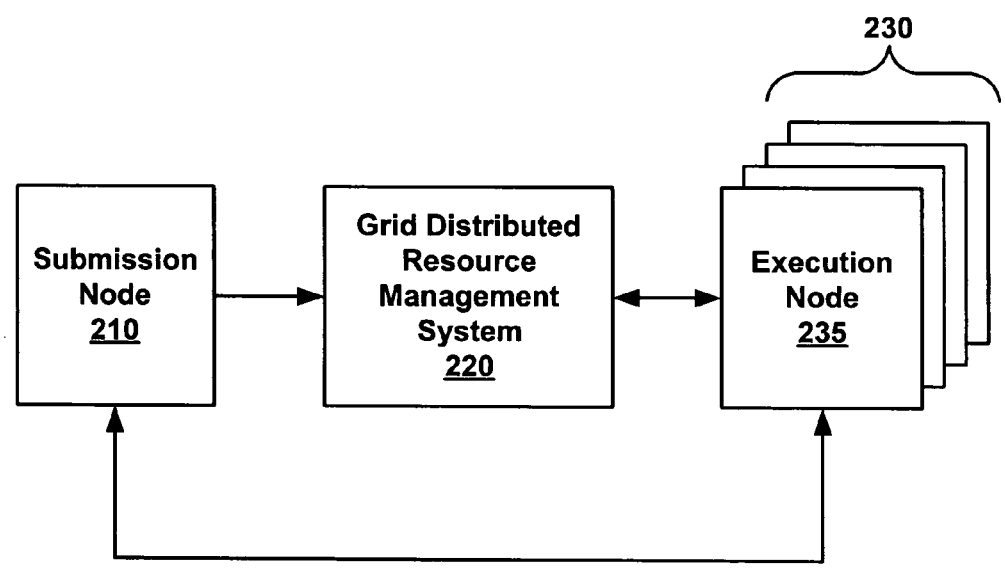
FIG. 2 is a data flow diagram illustrating the flow of information when implementing a grid computing environment, in accordance with one embodiment of the present invention.

Referring now to FIG. 2, a data flow diagram is shown illustrating the implementation of an exemplary grid computing system 200, in accordance with one embodiment of the present invention. The grid computing system consists of a plurality of heterogeneous execution nodes 230 distributed across multiple administrative domains. That is, the plurality of heterogeneous execution nodes reside in remote locations that are coupled together through a communication network, such as, the Internet. The plurality of heterogeneous execution nodes can be configured in any type of formation, for example, a plurality of clusters of nodes. The plurality of execution nodes 230 is managed by a grid distributed resource management (DRM) system 220.

The grid computing system 200 is capable of supporting graphical interactive sessions. A general discussion describing graphical interactive sessions is provided in the following co-pending U.S. patent application assigned to the present assignee: Ser. No. 10/340,436, entitled "GRID COMPUTING CONTROL SYSTEM," by Talwar et al., filed on Jan. 10, 2003, the disclosure of which is hereby incorporated herein by reference.

In the data flow diagram of FIG. 2, an end-user submits a request for an interactive session to the grid DRM through a submission node 210. On receiving the request from the user the grid DRM selects a remote execution node 235 based on the session requirements, and reserves this node 235 for the requested duration of the session. In addition, the grid DRM also performs an advance reservation of fine grained resources like central processing unit (CPU) and network bandwidth for the user's session. At the requested time, the grid DRM would establish an interactive session between this remote execution node 235 and the end-user's submission node 210. The end-user then interacts directly with this remote execution node 235 through the established session.

Figure 3:
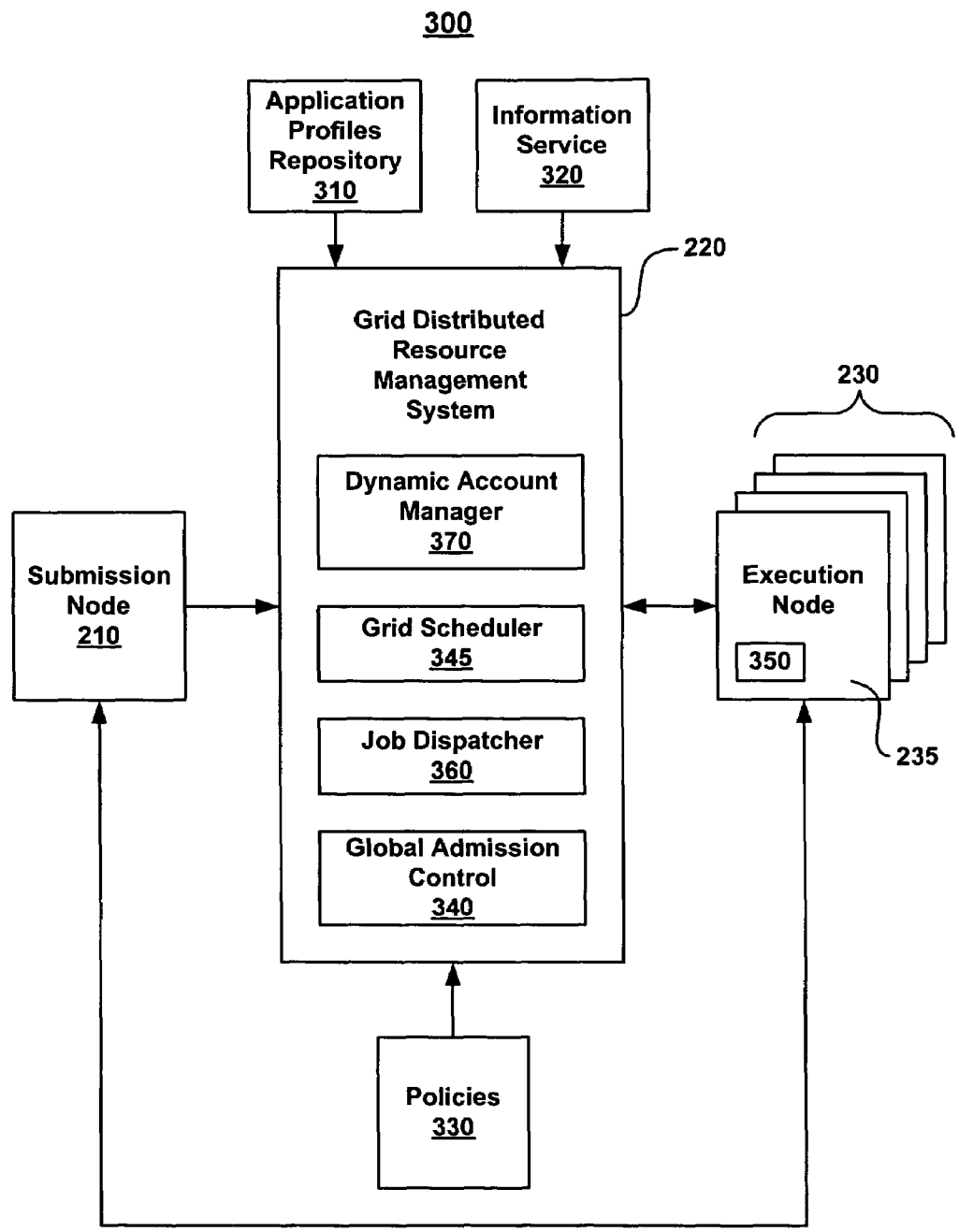
FIG. 3 is a block diagram illustrating an exemplary grid computing environment, in accordance with one embodiment of the present invention.

Referring now to FIG. 3, a block diagram of an exemplary grid computing environment 300 is shown in more detail, in accordance with one embodiment of the present invention. The grid computing environment 300 comprises a submission node 210, a grid scheduler node 220, and a plurality of execution nodes 230, as previously described in relation to FIG. 2. In addition, each of the blocks in FIG. 3 within the grid computing environment 300 are remotely located, in one embodiment. Also, the configuration of the blocks allows for the inclusion of one or more blocks located in one node location. The blocks in FIG. 3 are communicatively coupled together through a network, such as, the Internet.

In addition, the grid computing environment 300 also comprises an information service 320. The information service 320 stores information about the computing resources associated with and located at each of plurality of execution nodes 230. In addition, an application profiles repository 310 stores the application profiles of the grid computing environment 300. The policies module 330 provides the rules and policies for implementing and running the grid computing environment 300.

In one embodiment of the present invention, the end-user can submit requests directly to the remote execution node 235, to launch multiple applications. A session launching multiple applications is defined as a global interactive session. This global interactive session thus constitutes the interaction of the end-user with the remote node, and involves the launching of one or more applications. Subsequently, the end-user in the session uses and interacts with the launched applications through separate per-application sessions. These interactions could be textual or graphical based. As such, the grid computing system 200 supports graphical interactive sessions between end-users and remote execution nodes. An example of a global interactive session is a remote display session wherein the graphical desktop of the remote execution node 235 is exported to the submission node 210.

In another embodiment of the present invention, the end-user submits requests to launch a single application. A session launching one application is defined as a per application interactive session. A per-application interaction session constitutes the association between the end-user and the executing application, where the end-user interacts directly with the application. A per-application interactive session occurs in the context of a global interactive session.

In one embodiment, a hierarchical admission control is achieved through the implementation of global and per-application interactive sessions. Admission control is implemented through a global admission control module 340 at the grid DRM node 220, and a per-application session admission control module 350 at the selected remote execution node 235. The global admission control module 340 and the per-application admission control module 350 make admission control decisions for global and per-application sessions, respectively.

The following is the sequence of steps for initiating global and per-application sessions, in accordance with one embodiment of the present invention. To start, the end-user creates a job request template for a new global interactive session, specifying the resource requirements, session requirements, and the desired list of applications to be launched during the session. This request is submitted to the grid DRM node 220 from the submission node 210.

The request is received by a grid scheduler 345 running on the grid DRM node 220. In the first pass, the grid scheduler 345 performs a matching of resources in the plurality of remote execution nodes 230 to satisfy the coarse requirements of the user, for example, matching of the hardware requirements of the user. The grid DRM 220 provides a distributed repository as included in the information services module 320 where various resources can publish their services, in one embodiment. The grid scheduler 345 queries this distributed repository, as well as the application profiles repository 310 and the information service 320, to discover resources that match with the user's job needs.

In the next pass, the grid scheduler 345 selects the best remote execution node that can admit the requested global interactive session satisfying the quality-of-service (QoS) requirements for the desired list of applications to be launched during the global session. During this step, the grid scheduler 345 interfaces with the global admission control system 340, which performs the admission for the requested global interactive session.

At this time, a reservation is made on the selected remote execution node 235 for the requested global interactive session. The reservation is also made for fine grained resources such as CPU, network bandwidth, etc.

At the requested time, the selected remote execution node 235 is allocated to the end-user, and a job dispatcher 360 at the grid DRM 220 dispatches the request for the new global interactive session to the remote execution node 235. In addition, service level agreements (SLA) for the session are passed to the remote execution node 235.

A configuration process configures the system before launching the global interactive session. This involves the creation of a dynamic account by a dynamic account manager 370 at the grid DRM 220. A global interactive session is then initiated between the allocated execution node and the end-users' submission node. The dynamic account manager 370 maintains pools of dynamic accounts on each resource. Unlike normal user accounts which remain permanently assigned to the same real-world user, a dynamic account is assigned to a user temporarily. In that way, a user can be assigned a resource in the grid computing environment, even though that user does not have an account on that particular computing resource. After the user has been authenticated, the user may be authorized to use a normal static account if authorized, or the user may be assigned a dynamic account from a pool of dynamic accounts.

Alternately the user's membership in a virtual organization (VO) may be verified by a directory service maintained by the VO. In that case, a dynamic account from the pool maintained for that VO can be assigned to the user. This approach is more scalable since every user joining or leaving a VO does not require the addition or deletion of a file entry on all the resources made available to the VO.

The end-user can now request new per-application interactive sessions directly through the started global interactive session. The requests for per-application interactive sessions are verified for access control checks, and if successful are passed onto the session admission control system 350 on the associated remote execution node (e.g., execution node 235). The session admission control system 350 performs an admission control check to determine if the requested per application session can be admitted into the global interactive session. If not, the request for new per-application session is denied. Otherwise, the per-application session is started.

In addition, for QoS purposes, resource management monitoring agents monitor the global interactive session and per-application session utilization values. The monitored data is aggregated by aggregator agents. Enforcement agents use this data to enforce the SLA and QoS requirements. For example, the enforcement agents can end the global interactive session at the time specified in the SLA.

Pinning a Resource Having an Affinity to a User for Resource Allocation

Figure 4:
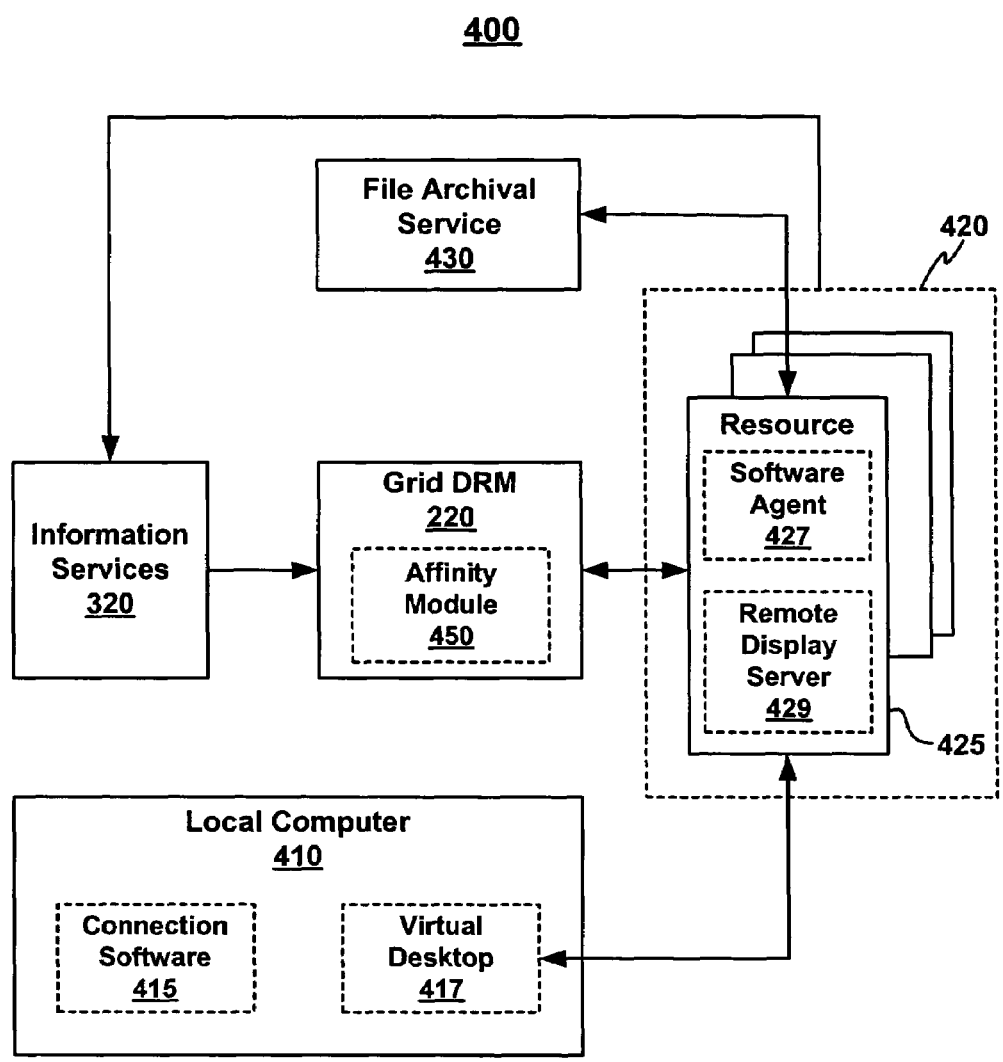
FIG. 4 is a block diagram illustrating an exemplary grid computing environment that is capable of assigning resources that have an affinity to a user for supporting an interactive session, in accordance with one embodiment of the present invention.

FIG. 4 is a block diagram of a grid computing environment 400 that is capable of pinning computing resources to a user for supporting an interactive session, wherein the pinned resources have an affinity to that user, in accordance with one embodiment of the present invention. Each of the blocks in FIG. 4 within the grid computing environment 400 are remotely located, in one embodiment. Also, the configuration of the blocks allows for the inclusion of one or more blocks located in one node location. The blocks in FIG. 4 are communicatively coupled together through a network, such as, the Internet.

One or more resources from the plurality of resources 420 that are available in the grid computing environment 400 are assigned to a user through communication between a local computer 410 and a grid DRM 220, as previously described. The local computer 410, or submission node, comprises connection software 415 and a virtual desktop environment 417. The connection software 415 provides an interface for communicating with the grid DRM 220 in obtaining computing resources that support an interactive computing session associated with the user. That is, the user executes the connection software 415 to connect to the grid DRM 220 in order to request one or more resources to support an interactive session available to the user.

The virtual desktop 417 is provided to the user at the local computer 410 to allow the user to interact with the applications supported by the selected computing resource. The virtual desktop 417 is generated using processing power controlled and/or provided by a remote display server 429 located on the selected computing resource 425, instead of using processing power from the local computer 410. A software agent 427 that is located on the selected computing resource 425 is directed by the grid DRM to start the remote display server 429 and export the virtual desktop 417 to the local computer 410. In one embodiment, the virtual desktop 417 appears visible on a display viewable to the user as a window. In another embodiment, the virtual desktop appears as a frame within the displayed window interface of the connection software 417.

The information services module 320 contains information pertaining to the resources of each of the plurality of computing resources 420, as previously explained. For example, the information is helpful in determining ultimately which computing resource is selected for a particular interactive session that is tailored to perform a specific function or application. In one embodiment, the information services module 320 is a standalone service that supports the grid computing environment 400.

The information may contain performance characteristics, such as, computing power, computing speed, types and amounts of memory, bandwidth, etc., and service characteristics. In one embodiment, the grid DRM provides an interface between the information services module 320 and the plurality of computing resources 420. In that case, the grid DRM 220 receives information regarding resource characteristics of each of the plurality of computing resources 420 and then transfers them to the information services module 320. In another embodiment, the information services module 320 communicates directly with each of the plurality of computing resources 420 to obtain each of their resource characteristics.

The grid computing environment 400 also comprises a file archival service 430. The file archival service is communicatively coupled with each of the computing resources in the plurality of computing resources 420. For example, FIG. 4 illustrates that resource 425 is communicatively coupled to the file archival service 430. The file archival service maintains the most current version of each file. In one embodiment, the file archival service performs backup services by backing up each of the files located within the plurality of computing resources 420. In addition, the file archival service assigns version identifiers to each of the files in the file archival service. The version identifiers help determine which version of a file that is stored in two or more locations is the latest version of the file.

As previously described, the grid DRM 220 selects the computing resource (e.g., the selected computing resource 425) to support an interactive session associated with a user. The selection of the selected computing resource 425 is performed by the affinity module 450. In one embodiment, a selector in the grid DRM 220 comprises the affinity module that performs the selection process. The affinity module determines if there are any computing resources having any affinity to the user, and selects the computing resource with the best affinity to the user, as will be more fully explained in FIG. 5 below. That is, the affinity module selects the computing resource that requires the least amount of initialization in order to support the interactive session.

The grid DRM 220 makes a best effort to select computing resources having an affinity to the user, until another user requires that computing resource, at which point the computing resource no longer is pinned to the user. For example, the computing resource comprises hardware and software resources, such as, CPU, memory, applications, etc. As such, the grid DRM 220 keeps in reserve a computing resource, such as, memory that contains the user's data, that is pinned to the user. At the very least, the grid DRM 220 tries to reserve the dynamic account assigned to the user so that the dynamic account has an affinity to the user.

Lacking any resources with affinity for the user, the affinity module and the grid DRM 220 then selects the computing resource 425 that best matches the resource requirement profile requested by the user when initially requesting the support of an interactive session through the grid computing environment 400.

Table 1 illustrates an example of considering affinity when assigning computing resources to a user requesting an interactive session, in accordance with one embodiment of the present invention. As described previously, a resource has an affinity to a user when that computing resource is configured to the user, such as, a memory resource that contains the latest version of data associated with the user, or a dynamic account that is configured and assigned to that user. Table 1 lists two resources with possible affinity to the user: a dynamic account associated with a cluster of computing nodes (e.g., an administrative domain of computing nodes), and a memory resource located on a computing node. In combination, affinity of a user with the dynamic account and memory resource is highest when both resources are configured to the user, thus require little or no initialization. In combination, affinity of the user considering the dynamic account and memory resource is lowest when both resources are not configured to the user and require a lengthy initialization process to configure those resources to the user.

In the example of Table 1, on Day One, the grid DRM has previously reserved the resources of the dynamic account and the memory resource to User-1. That is, the grid DRM has previously pinned to resources to User-1. As such, an interactive session using the dynamic account and the memory resource that are pinned to User-1 on Day One can utilize the resources with little initialization. At the end of the interactive session, the grid DRM again pins the resources that are configured to User-1 so that they maintain a high affinity with User-1. That is, the dynamic account and the memory resource are reserved for User-1 for the longest time possible. In that case, should User-1 request another interactive session, assuming no change in affinity, the dynamic account and the memory resource could be re-allocated to User-1 in the new interactive session with minimal initialization.

On Day-Two, User-1 requests another interactive session. In the interim period between interactive sessions, the dynamic account that was assigned to User-1 has been utilized by another user, User-2, and has been re-assigned to the root account for that administrative domain. Alternatively, the dynamic account could be assigned to User-2. In that case, the dynamic account no longer has an affinity to the User-1. On the other hand, the memory resource still maintains an affinity to User-1. That is, in the interim period, the data stored in the memory resource has not been re-allocated or assigned to another user, and the data in stored in the memory resource still is assigned or allocated to User-1. In that case, the memory resource still maintains an affinity to User-1. As such, in combination, the memory resources have decreased affinity to User-1 from Day One. While the memory resource need not be initialized and can be assigned to User-1, a new dynamic account must be initialized to User-1 to support the new interactive session.

In one embodiment, the affinity is scalable in the resource. For example, in the memory resource, the storage area assigned to User-1 may be re-allocated to another user (e.g., User-1) a portion at a time. That is, the affinity to the user decreases as the storage for the data is re-allocated to another user. In that case, the affinity to User-1 is calculated in proportion to the amount of memory that remains allocated to User-1.

On Day-Three, User-1 requests another interactive session. In the interim period from the interactive session on Day-Two, both the dynamic account and the memory resource have been assigned to another user or users. In that case, neither resource has an affinity to User-1. In combination, the computing resources have the least amount of affinity to User-1. As such, those resources assigned to User-1 to support the new interactive session need to go through a lengthy initialization process to configure those resources to User-1.

TABLE 1

Affinity in Computing Resources

| Day | Dynamic Account | Memory Resource |
|---|---|---|
| Day One | User-1 | User-1 |
| Day Two | Root Account | User-1 |
| Day Three | Root Account | Another User |

Figure 5:
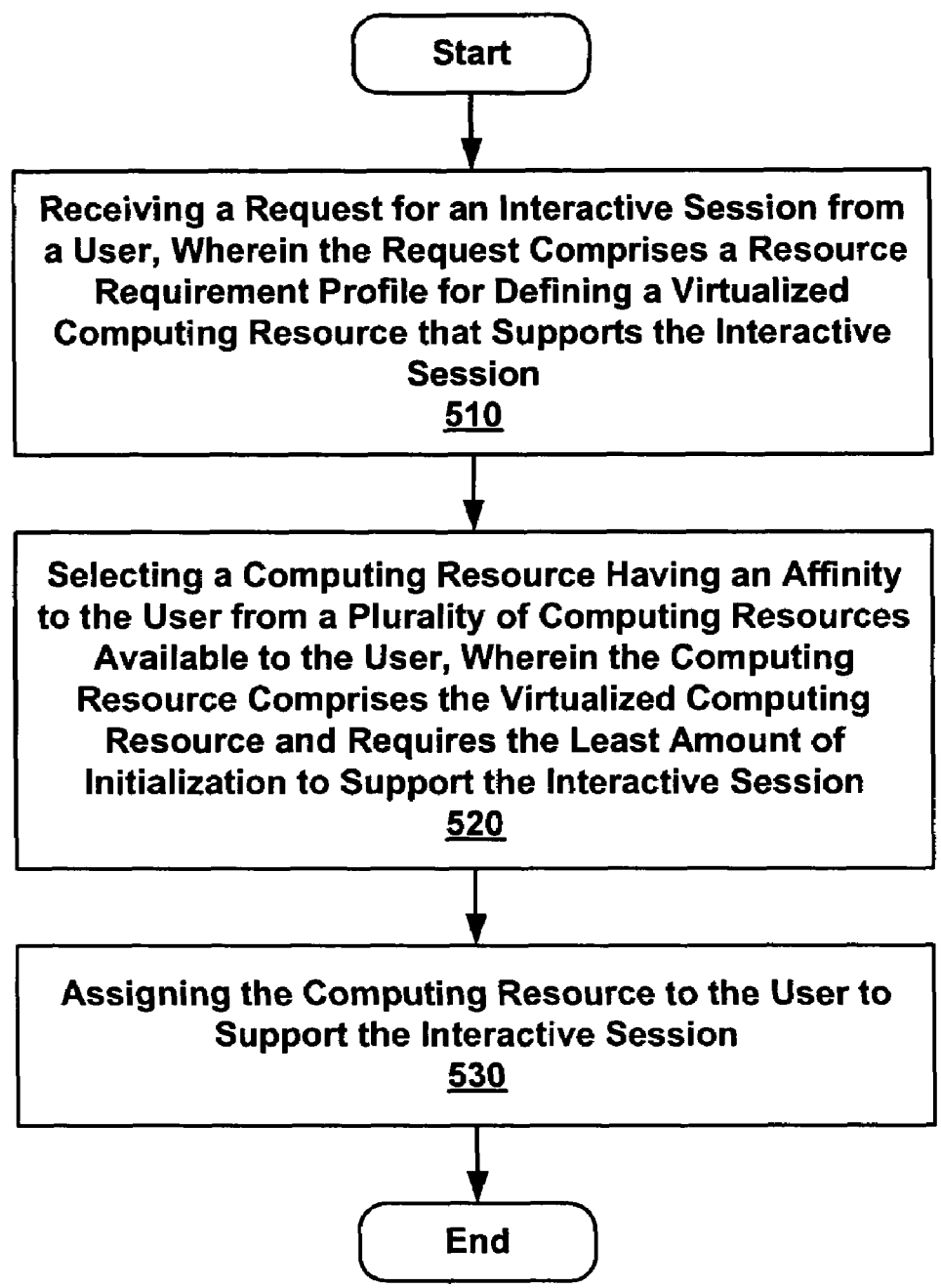
FIG. 5 is a flow chart illustrating steps in a computer implemented method for pinning a computing resource that has an affinity to a user for use in supporting an interactive session, in accordance with one embodiment of the present invention.

Referring now to FIG. 5, a flow chart 500 is disclosed illustrating steps in a computer implemented method for resource allocation, in accordance with one embodiment of the present invention. The method as disclosed in flow chart 500 is performed to assign one or more computing resources to support an interactive session. The method of flow chart 500 can be implemented within the grid computing environments 200, 300, and 400, in embodiments of the present invention.

In a grid computing environment, computing resources are virtualized in the sense that the user does not need to know the name or IP address of a computing resource that can support an interactive session requested by the user. Instead, the best computing resource is selected and assigned from all available sites participating in the grid computing environment by considering specific resource requirements, as defined by a user.

At 510, the present embodiment begins by receiving a request for an interactive session from a user. Within the request, the user provides a resource requirement profile. The resource requirement profile includes information that is helpful for determining which resources (e.g., computing resources, services resources, etc.) are needed to support the interactive session. For example, such information can include processor type and speed, amount of memory, a particular operating system, etc. The resource requirement profile would vary depending on the needs of the user. For example, the resources needed to support an interactive session for the purposes of word processing and accessing e-mail are different than resources intended to support the accumulation and interpretation of global weather data.

At 520, the present embodiment continues by selecting a computing resource that has an affinity to the user from a plurality of computing resources. Each of the plurality of computing resources are available to the user, for example, within a grid computing environment. The selected computing resource supports the interactive session that is requested by the user.

The present embodiment selects the computing resource from the plurality of computing resources based on an affinity of the computing resource with the user. That is, the selected computing resource has an affinity with the user in that the computing resource undergoes the least amount of initialization before being able to support the interactive session. For example, the computing resource may have been used previously by the user to perform similar tasks and functions that are supported by the current interactive session. In that case, the computing resource may still be configured for the user. In addition, the computing resource may contain the most current files that are used by the user in the current interactive session. As such, the computing resource would undergo little or no initialization to be able to support the interactive session that is requested by the user.

That is, in one embodiment, for consecutive interactive sessions requested by a user, the same computing resource is assigned to minimize initialization in the later interactive session. Also, if the computing resource needs some customization or learning on the part of the user, the user only performs this once and works more efficiently on subsequent and/or consecutive sessions using the same computing resource.

At 530, the present embodiment assigns the selected computing resource to the user. The computing resource is used to support the interactive session that is requested by the user. By assigning computing resources that have an affinity to the user, the present embodiment minimizes the initialization process to configure the selected computing resource to the user. In that way, the interactive session is started more efficiently within the grid computing environment, in that, the transfer of files and the configuration of the selected computing resource to the user is minimized. That is duplication of effort is minimized when initializing the selected computing resource to the user.

After the end of the interactive session, the computing resources are pinned to the user to maintain affinity to the user. In that case, those computing resources maintaining an affinity to the user can be re-assigned to the user in the next interactive session in order to minimize the initialization process.

For full resource virtualization in a grid computing environment, computing resources that are available have dynamic accounts, in accordance with one embodiment of the present invention. A dynamic account on a computing resource is not associated permanently with a particular user. Instead, the dynamic account can be assigned for the duration of an interactive session to the user. That is, when the user authenticates to the grid computing environment, and gets assigned a selected computing resource with dynamic accounts, then one dynamic account from a pool of available dynamic accounts on that selected computing resource is temporarily assigned to the user. In that way, a user requesting an interactive session need not be tied to specific computing resources that may or may not be available. Also, a user can be assigned to a computing resource in the grid computing environment even though the user does not have an account on that particular computing resource. Instead, computing resources that meet the user's needs are assigned to support the interactive session through the use dynamic accounts, with an emphasis on assigning computing resources that have an affinity to the user.

The user's files have to be present on a file system accessible from the selected computing resource. The selected computing resource is assigned to the user to support an interactive session. Further, access rights for the user's files have to be given to the dynamic account assigned to the user. The files may need to be transferred to the selected computing resource if they are not locally cached in memory, in one embodiment. In another embodiment, the files may need to be restored at the beginning of the interactive session when the files are locally cached.

Figure 6:
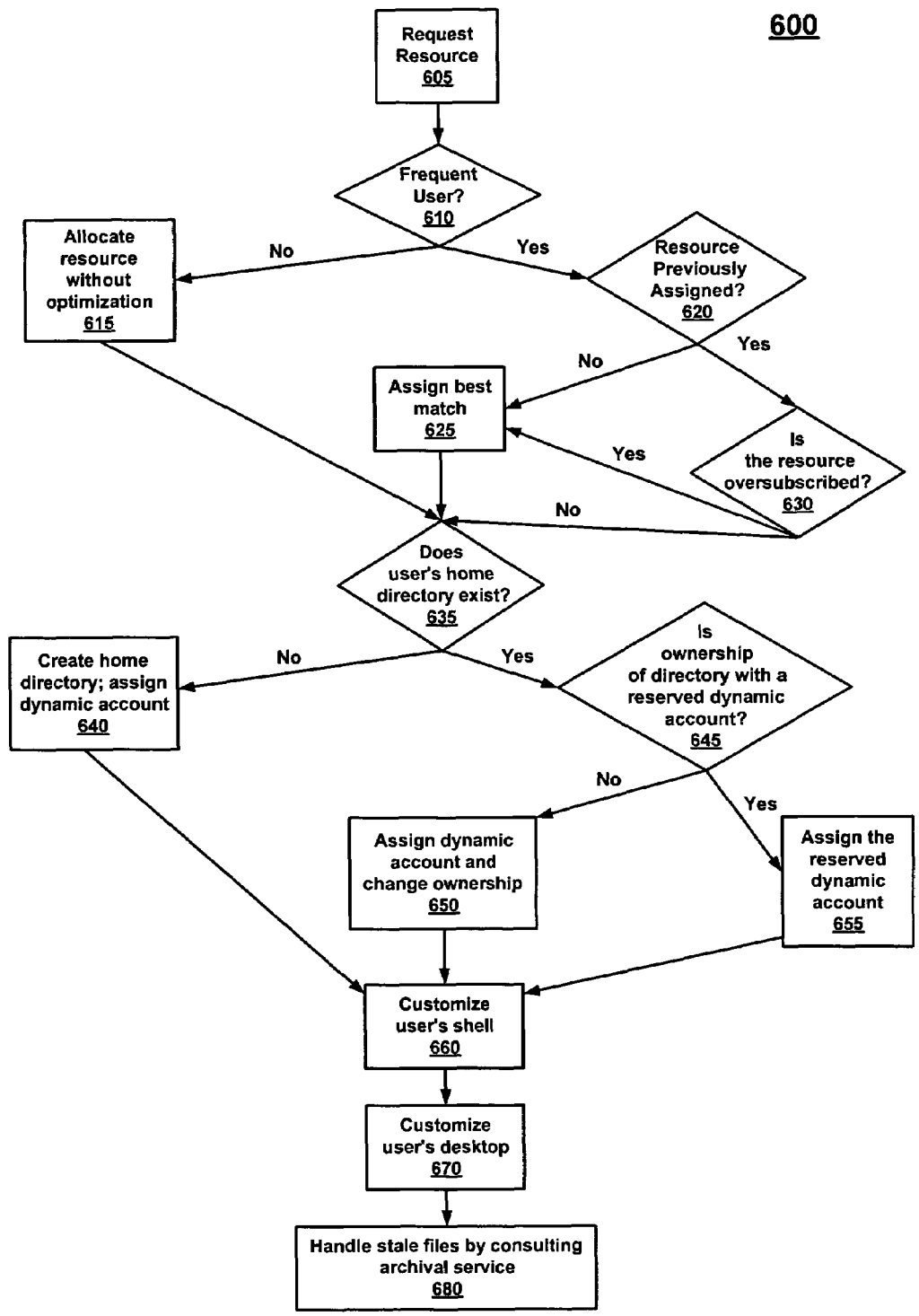
FIG. 6 is a flow chart illustrating steps in a computer implemented method for assigning a computing resource that has an affinity to a user for use in supporting an interactive session, in accordance with one embodiment of the present invention.

FIG. 6 is a flow chart 600 illustrating steps in a computer implemented method for allocating computing resources to a user that have an affinity to the user, in accordance with one embodiment of the present invention. More specifically, the flow chart 600 allocates a dynamic account in a selected computing resource in response to a request by a user for an interactive session.

The present embodiment begins by receiving a request for a computing resource, at 605. The request for resources is associated with a request for an interactive session from a user. The present embodiment can be implemented within a grid computing environment, in one embodiment of the present invention.

At 610, the present embodiment checks a history database to determine whether the user is classified as a frequent user. Assigning a computing resource to a user based on an affinity of the selected computing resource to the user is possible for frequent users of that selected computing resource. That is, the selected computing resource that has been previously allocated to that user, and is currently available, has an affinity to the user.

More specifically, the present embodiment checks a history of previous sessions within the grid computing environment. In one case, if the user frequently requested interactive sessions during certain time periods, it is best to assign computing resources that are expected to be available during those time periods. Also, there is a higher percentage that the user has used those computing resources that are available during those time periods. In that way, the least amount of initialization of the selected computing resource would be necessary, thereby starting the currently requested interactive session more quickly. That is, the selected computing resource may already be configured for the user. In that case, the computing resource would not have to undergo any initialization, or minimal initialization, to be ready to support the interactive session.

At 615, if the user is not a frequent user, then the present embodiment allocates a computing resource that does not have an affinity to the user, but provides a best match with the resource requirement profiles as defined by the user. In general, finding the best match involves checking the plurality of computing resources that are available. A comparison is made between the resource characteristics of each of the computing resources and the resource requirement profile as defined by the user. The selected computing resource provides the best match between its resource characteristics and the resource requirement profile. In one embodiment, the selected resource is fully capable of meeting the resource requirement profile. In another embodiment, the selected resource is not fully capable of meeting the resource requirement profile, but among all the plurality of computing resources provides the most support in meeting the resource requirement profile.

On the other hand, at 620, if the user is a frequent user, then affinity scheduling is possible to pin a selected computing resource that has an affinity to the user to support the interactive session. The present embodiment determines if a computing resource has been previously assigned to the user. In one embodiment, previously assigned resources are those computing resources that have been previously assigned to the user in support of previous interactive sessions. Those files associated with the user and used in previous interactive sessions may still be present in the pre-allocated computing resource. In that case, there will be no delay, or minimal delay, due to restoring files to the selected computing resource from a file archival system. This ensures that the user's subsequent and present interactive session starts faster.

If there is a previously assigned computing resource, the present embodiment proceeds to block 630. On the other hand, if there is not a previously assigned computing resource, then the present embodiment proceeds to block 625.

At 630, if there is a previously assigned computing resource, then the present embodiment determines if the previously assigned computing resource is available. That is, the present embodiment determines if the previously assigned computing resource is oversubscribed. If the previously assigned computing resource is available and not oversubscribed, then that previously assigned computing resource is selected as the computing resource to support the interactive session requested by the user, and the present embodiment proceeds to block 635. On the other hand, if the previously assigned computing resource is not available and is oversubscribed, then the present embodiment tries to get an available alternative, or failing that proceeds to block 625.

At 625, the present embodiment assigns the computing resource in the plurality of computing resources that are available that provides the best match with the resource requirement profile as defined by the user. That is, in one embodiment, a comparison is made between the user's resource requirement profile and the time slot usage profile associated with the user from the history database. That is, all the previously assigned computing resources to that user are considered to find one computing resource that may be partly, or fully configured, to support the user in the requested interactive session. In this case, a computing resource that is best able to meet the resource requirement profile, and that provides the least amount of initialization, becomes the best match. Thereafter, the present embodiment proceeds to block 635.

At 635, after selection of a selected computing resource is made, the present embodiment continues by determining if a home directory associated with the user still exists on the selected computing resource. The home directory provides access to the user's files, applications, and other service resources on the selected computing resource. If the home directory still exists, then initialization procedures are minimized before using the selected computing resource to support the interactive session.

At 640, if a home directory associated with the user does not exist on the selected computing resource, then the present embodiment creates a home directory for the user. Also, a dynamic account that is available is assigned to the newly created home directory. That is, the home directory for this dynamic account is the newly created home directory. In that way, the user can access files in the home directory through the dynamic account in the interactive session. After creation of the home directory, the present embodiment proceeds to block 660.

At 645, if a home directory associated with the user exists on the selected computing resource, then the present embodiment determines if ownership of the home directory is with a reserved dynamic account. More specifically, the present embodiment checks to see whether ownership of the user's directory tree, including all files and directories under it, is with a reserved dynamic account, or has been reassigned to a root account. That is, the present embodiment determines if there is an affinity between the user and a dynamic account that is reserved for the user.

At 655, if ownership of the home directory and directory tree is with a reserved dynamic account, then the present embodiment assigns the reserved dynamic account to the user. A check is made to verify that the home directory for the reserved dynamic account is still set correctly to the user's home directory. The present embodiment then proceeds to block 660.

On the other hand, if ownership of the home directory and directory tree is not with a reserved dynamic account and has been assigned to a root account, then the present embodiment chooses an available dynamic account and assigns that dynamic account to the user. Then the present embodiment changes ownership of the user's entire directory tree to that dynamic account. Also, the home directory for this newly chosen dynamic account is set to the user's home directory. Then the present embodiment proceeds to block 660.

In one embodiment, if there are still no available dynamic accounts, then the present embodiment reclaims a reserved dynamic account which is least likely to be reused. That is, the present embodiment makes available the reserved dynamic account that is reclaimed by changing ownership of the user's data that was associated with the user's dynamic account to the root directory. Thereafter, the home directory for this reclaimed dynamic account is set to the user's home directory. Then the present embodiment proceeds to block 660.

At 660, the present embodiment maps the shell for the assigned dynamic account to a restricted shell with a list of allowed commands customized for the user's credentials according to account policy files.

At 670, the present embodiment customizes the user's desktop so that programs and other functionalities of the desktop accessible to the user are restricted to those allowed by the account policy files.

At 680, the present embodiment updates the files in the directory tree. There is no guarantee that the files cached locally in the selected computing resource is the latest version of each of those files. This is because, the user might have been assigned another intervening session that was supported by another computing resource between two consecutive interactive sessions supported by the same computing resource. During the intervening interactive session, the user may have modified the files in the directory tree associated with the user. In this case, the latest version of those files may be located in a file archival service, or at another computing resource that supported an intervening session.

As such, the present embodiment verifies whether any of the files cached locally in the selected computing resource are stale. The present embodiment is able to locate the latest version of files by consulting the file archival service and any computing resource that supported an intervening session associated with the user. Stale files become temporarily unavailable, in one embodiment, while they are updated. Updating involves retrieval and copying of the latest version of files to the selected computing resource. Also, stale files could be invalidated, in another embodiment, until updated.

More particularly, one embodiment recursively traverses the home directory tree to check for stale files. For each file which is not excluded from synchronization by the account policy files, a version ID of the file is sent to the file archival service. In case a newer version of the file exists either in the file archival service, or at any other computing resource, then the file in the selected computing resource is marked as stale. Thereafter, the most current, or latest, version of the file is transferred to the selected computing resource to remove the stale mark.

In the example of Table 1, on Day-One, affinity is high for the computing resources. As such, the method of flow chart 600 would proceed in the following fashion: steps 605, 610, 620, 630, 635, 645, 655, 660, 670, and 680, in one embodiment for illustration purposes only. At Day-Two, affinity is less than Day-One in that the dynamic account has been re-allocated to another user. As such, the method of flow chart 600 would proceed in the following fashion: steps 605, 610, 630, 635, 645, 650, 660, 670, and 680, in one embodiment for illustration purposes only. At Day-three, there is no affinity. As such, the method of flow chart 600 would proceed in the following fashion: steps 605, 610, 620, 625, 635, 60, 660, 670, and 680, in on embodiment for illustration purposes only.

Figure 7:
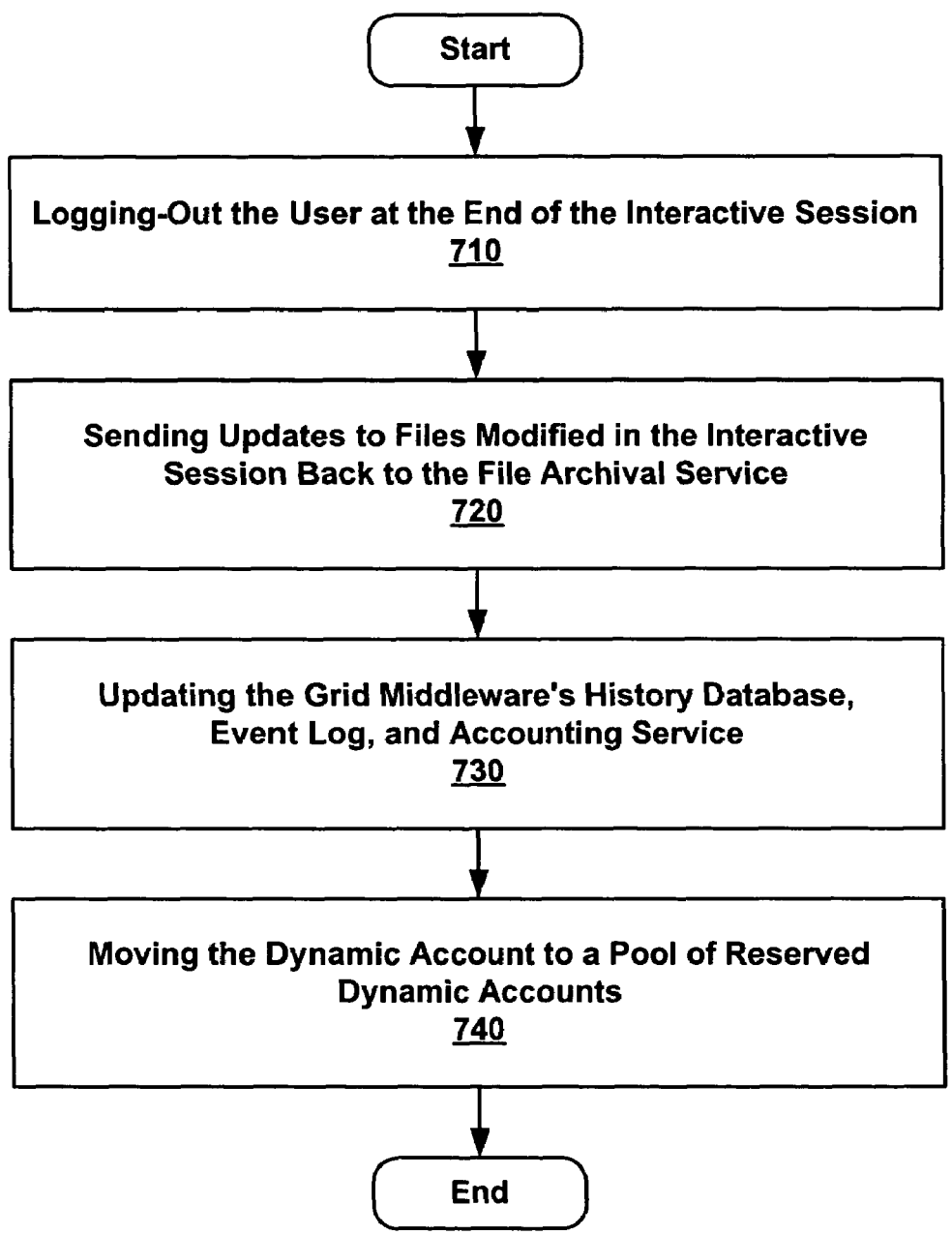
FIG. 7 is a flow chart illustrating steps in a computer implemented method for ending an interactive session in a grid computing environment, in accordance with one embodiment of the present invention.

Referring now to FIG. 7, a flow chart 700 illustrating steps in a method for ending an interactive session to promote affinity of the computing resource supporting the interactive session with a user associated with the interactive session is disclosed, in accordance with one embodiment of the present invention. In general, at the end of the interactive session, all files that have been modified during the interactive session are updated in the file archival service that supports the grid computing environment. In that way, a backup of the files is scheduled.

At 710, the present embodiment begins by logging out the user at the end of the interactive session. The present embodiment warns the user in advance in order to give the user an opportunity to extend the interactive session.

At 720, the present embodiment continues by sending updates to those files that were modified in the interactive session back to the file archival service. That is, the latest version of those files are transferred to the file archival service. A new version ID is obtained for these modified and updated files.

At 730, the present embodiment updates the grid computing environments history database, event log, and accounting service. In this way, this computing resource can be easily re-located as a pinned computing resource for a subsequent interactive session associated with the user.

At 740, the present embodiment moves the dynamic account that was assigned to the user for the interactive session to a pool of reserved dynamic accounts. In that way, if the user is a frequent user, then when the user returns for another interactive session, and before the dynamic account is reused, the ownership of the files do not have to change, thereby minimizing the initialization process.

While the methods of embodiments illustrated in flow charts 500, 600, and 700 show specific sequences and quantity of steps, the present invention is suitable to alternative embodiments. For example, not all the steps provided for in the methods are required for the present invention. Furthermore, additional steps can be added to the steps presented in the present embodiment. Likewise, the sequences of steps can be modified depending upon the application.

A method and system for pinning resources that have an affinity to a user for resource allocation is thus described. While the invention has been illustrated and described by means of specific embodiments, it is to be understood that numerous changes and modifications may be made therein without departing from the spirit and scope of the invention as defined in the appended claims and equivalents thereof. Furthermore, while the present invention has been described in particular embodiments, it should be appreciated that the present invention should not be construed as limited by such embodiments, but rather construed according to the below claims.

What is claimed is:

1. A resource allocation method comprising:
   receiving a request for an interactive session from a user, wherein said request comprises a resource requirement profile for defining a virtualized computing resource that supports said interactive session;
   selecting a computing resource having an affinity to said user from a plurality of computing resources available to said user, wherein said computing resource comprises said virtualized computing resource and requires the least amount of initialization to support said interactive session;
   assigning said computing resource to said user to support said interactive session;
   assigning an existing home directory for said user on said computing resource to a first dynamic account that is reserved for said user; and
   assigning an existing home directory for said user on said computing resource to a second dynamic account that is available to said user if no dynamic account is reserved for said user.

2. The method of claim 1, wherein said selecting a selected computing resource further comprises:
   selecting said computing resource from said plurality of computing resources as having files in memory that will be used in said interactive session.

3. The method of claim 1, wherein said selecting a selected computing resource further comprises:
   selecting an available computing resource previously assigned to said user and reserved for said user as said computing resource if said user is a frequent user; and
   selecting another computing resource as said computing resource that best satisfies said resource requirement profile if said available computing resource previously assigned to said user is not available.

4. The method of claim 1, further comprising:
   selecting said computing resource from said plurality of computing resources that best satisfies said resource requirement profile if said user is not a frequent user.

5. The method of claim 1, further comprising:
   pinning said selected computing resource to said user after an end to said interactive session.

6. The method of claim 1, further comprising:
   creating a new home directory for said user if a home directory for said user does not exist in said computing resource; and
   assigning said new home directory to a dynamic account associated with said computing resource.

7. The method of claim 1, further comprising:
   updating files assigned to said user in said selected computing resource for use in said interactive session.

8. The method of claim 1, wherein said plurality of resources are configured in a grid computing environment.

9. A computer system comprising:
   a processor, and
   a computer readable memory coupled to said processor and containing program instructions that, when executed, implement a resource allocation method comprising:
   receiving a request for an interactive session from a user, wherein said request comprises a resource requirement profile for defining a virtualized computing resource that supports said interactive session;
   selecting a computing resource having an affinity to said user from a plurality of computing resources available to said user, wherein said computing resource comprises said virtualized computing resource and requires the least amount of initialization to support said interactive session;
   assigning said computing resource to said user to support said interactive session;
   assigning an existing home directory for said user on said computing resource to a first dynamic account that is reserved for said user; and
   assigning an existing home directory for said user on said computing resource to a second dynamic account that is available to said user if no dynamic account is reserved for said user.

10. The computer system of claim 9, wherein said selecting a computing resource in said method further comprises:
    selecting said computing resource from said plurality of computing resources as having files in memory that will be used in said interactive session.

11. The computer system of claim 9, wherein said selecting a computing resource in said method further comprises:
    selecting an available computing resource previously assigned to said user and reserved for said user as said computing resource if said user is a frequent user; and
    selecting another computing resource as said computing resource that best satisfies said resource requirement profile if said available computing resource previously assigned to said user is not available.

12. The computer system of claim 9, wherein said method further comprises:

selecting said computing resource from said plurality of computing resources that best satisfies said resource requirement profile if said user is not a frequent user.

13. The computer system of claim 9, wherein said method further comprises:

pinning said selected computing resource to said user after an end to said interactive session.

14. The computer system of claim 9, wherein said method further comprises:

creating a new home directory for said user if a home directory for said user does not exist in said computing resource; and assigning said new home directory to a dynamic account associated with said computing resource.

15. The computer system of claim 9, wherein said method further comprises:

updating files assigned to said user in said selected computing resource for use in said interactive session.

16. The computer system of claim 9, wherein said plurality of resources are configured in a grid computing environment.

* * * * *

UNITED STATES PATENT AND TRADEMARK OFFICE
CERTIFICATE OF CORRECTION

PATENT NO. : 7,340,522 B1 Page 1 of 1
APPLICATION NO. : 10/632447
DATED : March 4, 2008
INVENTOR(S) : Sujoy Basu et al.

It is certified that error appears in the above-identified patent and that said Letters Patent is hereby corrected as shown below:

In column 16, line 27, in Claim 9, after "processor" delete "," and insert --;--, therefor.

Signed and Sealed this

Thirtieth Day of June, 2009

JOHN DOLL
*Acting Director of the United States Patent and Trademark Office*